United States Patent
Lemense et al.

(10) Patent No.: US 9,182,305 B2
(45) Date of Patent: Nov. 10, 2015

(54) PRESSURE MONITORING CIRCUITS AND METHODS

(71) Applicant: Infineon Technologies AG, Neubiberg (DE)

(72) Inventors: Thomas Lemense, Farmington, MI (US); Thomas Lange, Munich (DE)

(73) Assignee: INFINEON TECHNOLOGIES AG, Neubiberg (DE)

(*) Notice: Subject to any disclaimer, the term of this patent is extended or adjusted under 35 U.S.C. 154(b) by 229 days.

(21) Appl. No.: 13/924,640

(22) Filed: Jun. 24, 2013

(65) Prior Publication Data
US 2013/0289898 A1 Oct. 31, 2013

Related U.S. Application Data

(63) Continuation of application No. 12/955,105, filed on Nov. 29, 2010, now Pat. No. 8,498,829.

(51) Int. Cl.
*G06F 19/00* (2011.01)
*G01L 7/00* (2006.01)
*B60C 23/04* (2006.01)
*G01L 27/00* (2006.01)

(52) U.S. Cl.
CPC ............... *G01L 7/00* (2013.01); *B60C 23/0474* (2013.01); *B60C 23/0488* (2013.01); *G01L 27/002* (2013.01)

(58) Field of Classification Search
CPC .............................. A61B 5/0215; G01N 21/73
USPC ............................................. 702/50, 182–185
See application file for complete search history.

(56) References Cited

U.S. PATENT DOCUMENTS

| | | | |
|---|---|---|---|
| 7,950,286 B2 | 5/2011 | Bentley | |
| 8,312,760 B2 | 11/2012 | Buganza et al. | |
| 2007/0090935 A1 | 4/2007 | Miller et al. | |
| 2007/0222193 A1 | 9/2007 | Ito | |
| 2008/0034836 A1* | 2/2008 | Eigler et al. | 73/1.61 |

FOREIGN PATENT DOCUMENTS

EP 2075209 A1 7/2009

* cited by examiner

*Primary Examiner* — Edward Raymond
(74) *Attorney, Agent, or Firm* — SpryIP, LLC

(57) ABSTRACT

A pressure monitoring device comprises an analog-to-digital converter (ADC) to receive an analog signal and to convert the analog signal to a digital signal. The pressure monitoring device is configured to apply in a first state a first set of calibration coefficients to the digital signal, the first set of calibration coefficients being associated with a first pressure range. The pressure monitoring device is further configured to apply in a second state a second set of calibration values to the digital signal, the second set of calibration coefficients being associated with a second pressure range different than the first pressure range.

14 Claims, 6 Drawing Sheets

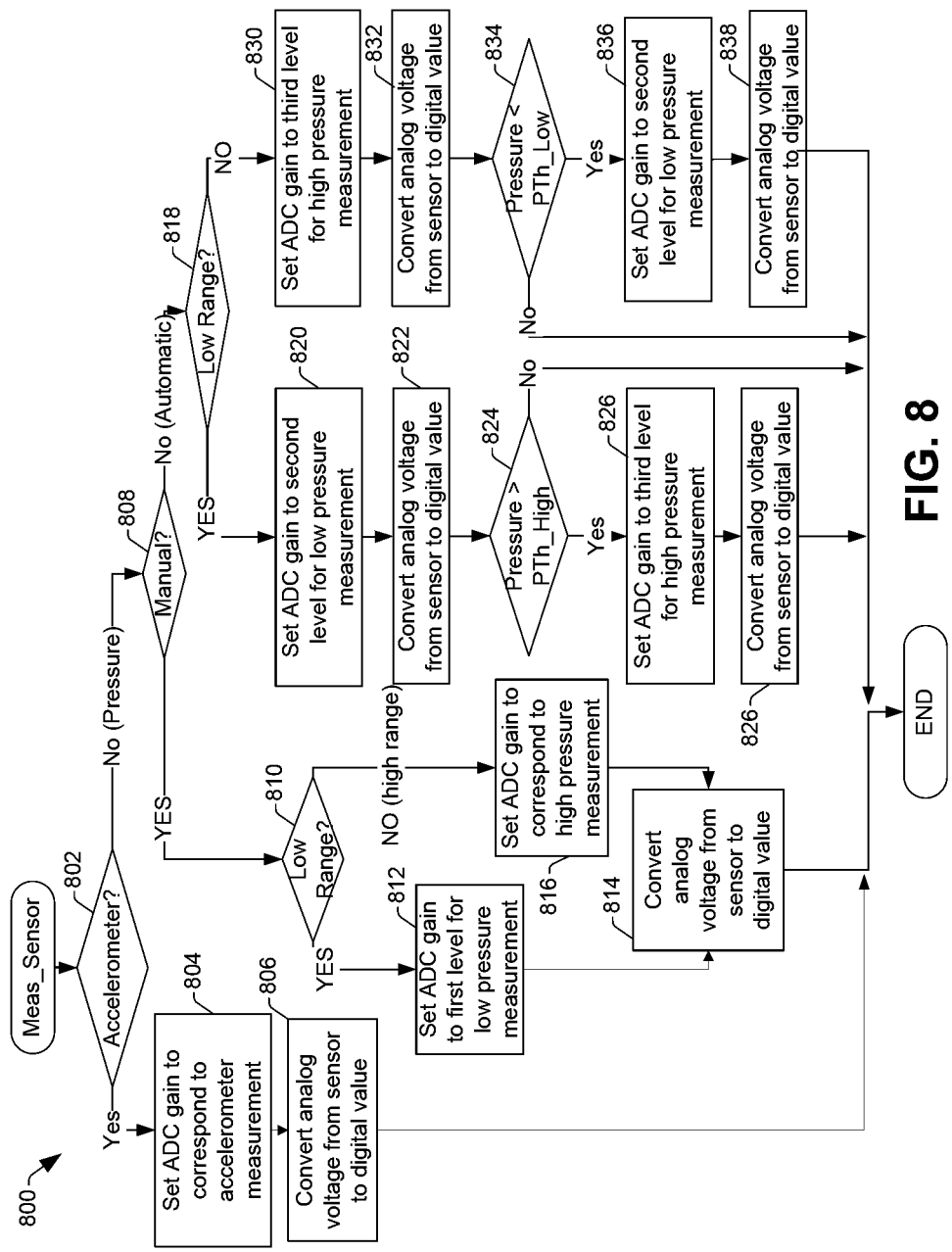

PRESSURE MONITORING CIRCUITS AND METHODS

REFERENCE TO RELATED APPLICATIONS

This application is a continuation of U.S. patent application Ser. No. 12/955,105 which was filed on Nov. 29, 2010 and claims the benefit of the priority date of the above US application, the contents of which are herein incorporated in its full entirety by reference.

BACKGROUND

Pressure monitoring systems are used in many applications. For example, a tire pressure monitoring system (TPMS) often measures tire pressure for a vehicle and notifies a vehicle's operator if the measured tire pressure falls outside of an ideal tire pressure range. Thus, a TPMS improves safety for the vehicle operator and for surrounding vehicle operators.

A TPMS for a vehicle often includes one tire pressure monitoring sensor per wheel, plus an electronic control unit (ECU). FIG. 1 shows an example of a conventional tire pressure monitoring sensor 100. The sensor 100 includes a pressure sensor 102, an analog-to-digital-converter (ADC) 104, and a microcontroller 106. During operation, the pressure sensor 102 provides an analog signal 108, and the ADC 104 converts the analog signal 108 to a digital signal 110. The microcontroller 106 puts the digital signal into a formal suitable for transmission to the ECU. The ECU then evaluates the formatted digital signal to determine whether the measured pressure falls within an acceptable tire pressure range, and can alert the driver if the pressure falls outside this acceptable range.

Although conventional pressure monitoring systems are adequate in many respects, they suffer from a shortcoming in that they are unable to flexibly monitor different pressure ranges. For example, although one sensor is useful in measuring pressures for tires of passenger vehicles, which can have normal tire pressures in the range of about 100 kPa-450 kPa; the same sensor is unable to effectively measure pressures for tires of commercial vehicles, which can have normal tire pressures in the range of bout 100 kPa-850 kPa. Consequently, the present disclosure provided improved methods and systems for monitoring pressure.

DESCRIPTION OF THE DRAWINGS

FIG. 8 is a flow chart illustrating a methodology consistent with one example of FIG. 7's block diagram.

DETAILED DESCRIPTION

Figure 1:
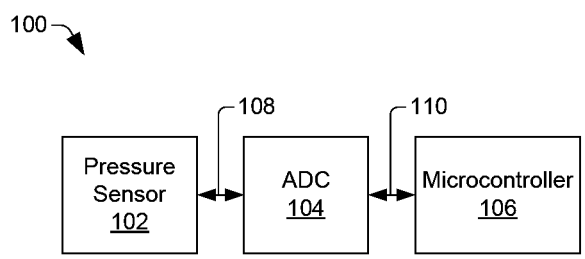
FIG. 1 is a block diagram illustrating a conventional pressure sensor system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

In order to provide better resolution over a potentially wider pressure range than previously available, the techniques disclosed herein set an output precision of an ADC based on a control signal provided by a control element. The control signal sets the output precision of the ADC to a first level to measure an ambient pressure within a first pressure range; and signal sets the output precision of the ADC to a second level to measure an ambient pressure within a second pressure range.

Figure 2:
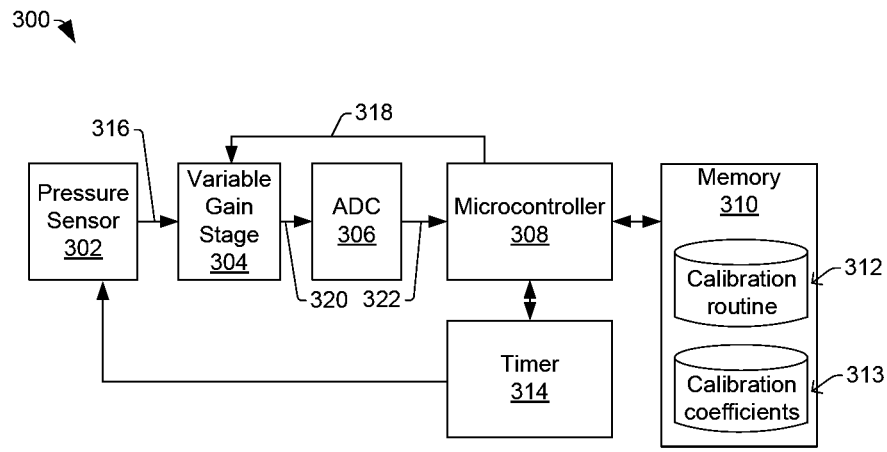
FIG. 2 is a block diagram illustrating a pressure sensor system in accordance with some embodiments of the present disclosure.

FIG. 2 shows a pressure monitoring system 300 in accordance with some embodiments of this disclosure. The pressure monitoring system 300 includes a pressure sensor 302, a variable gain stage 304, an ADC 306, a microcontroller 308, and a memory 310; which are operably coupled as shown. A timer 314, such as a watch-dog timer, can also be included in some implementations. In one embodiment, the microcontroller 308 utilizes a calibration routine 312 (e.g., in the form of firmware stored in read-only memory or flash memory), wherein the calibration routine 312 selects one of a number of sets of calibration coefficients 313 that is specific to the pressure sensor 302 and devices included for a particular pressure monitoring system (a number of sets of calibration coefficients 313 can be included to accommodate part-to-part variation). In some embodiments, the calibration coefficients 313 are stored in some sort of programmable, but not necessarily re-programmable, memory (e.g., read-only memory, flash).

During operation, the pressure sensor 302 outputs an analog signal 316, wherein a signal level of the analog signal 316 is indicative of an ambient pressure sensed by the pressure sensor 302. The variable gain stage 304 selectively adjusts the signal level of the analog signal 316 based on a control signal 318 provided by the microcontroller 308. The ADC 306 then converts the analog signal having a selectively adjusted signal level 320 into an N-bit digital value 322. Typical values for N are 8, 9, 10, 11, or 12 bits, although N can be any integer number ranging in theory from 1 to infinity.

More particularly, if the control signal 318 is in a first state, the gain stage 304 adjusts the signal level of the analog signal 316 according to a first gain, thereby tuning the N-bit output of the ADC 306 to correspond to a first pressure range (e.g., 100 kPa-850 kPa used for commercial vehicles.) If the control signal 318 is in a second state, the gain stage 304 adjusts the signal level of the analog signal 316 according to a second gain, thereby tuning the N-bit output of the ADC 306 to correspond to a second pressure range (e.g., 100 kPa-450 kPa used for passenger vehicles.) In this way, the control signal 318 provides a single pressure monitoring system with sufficient flexibility to be used in a number of different applications.

Figure 3:
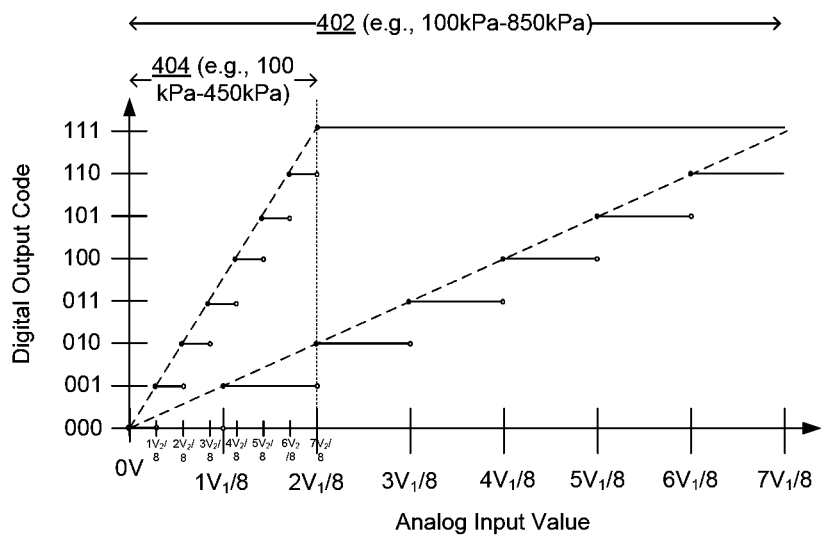
FIG. 3 is a plot illustrating functionality consistent with one example of FIG. 2's block diagram.

FIG. 3 shows a more detailed example of a 3-bit ADC (e.g., ADC 306 in FIG. 2) consistent with FIG. 2's implementation. In this example, a control signal (e.g., control signal 318 in FIG. 2) changes the gain of the ADC between a first state and a second state to measure a first pressure range 402 and a second pressure range 404, respectively.

When the control signal is in the first state during 402, the gain of the variable gain stage is set to a first level, causing the analog input value of the ADC to range from 0V to $7V_1/8$. Consequently, the eight unique digital output values of the ADC are approximately equally spread over the entire first pressure range 402 (e.g., a first pressure range for commercial vehicles having an ideal tire pressure ranging from 100 kPa-850 kPa). Thus, the first output code can correspond to a pressure measurement of 100 KPa, the second output code can correspond to a pressure measurement of 193.75 kPa, and so on such that the eighth pressure measurement is near the top of the first pressure range (e.g., 850 kPa).

When the control signal is in the second state during 404, the gain of the variable gain stage is set to a second level, causing the analog input value to be "compressed". In the illustrated example, the ADC now ranges from 0V to $2V_1/8$ V. Consequently, the eight unique digital output values of the ADC are approximately equally spread over the entire second pressure range (e.g., a second pressure range for passenger vehicles having an ideal tire pressure ranging from 100 kPa-450 kPa). Thus, the first output code can correspond to a pressure measurement of 100 KPa, the second output code can correspond to a pressure measurement of 143.75 kPa, the third output code can correspond to a pressure measurement of 187.5 kPa, and so on such that the eighth pressure measurement is near the top of the second pressure range (e.g., 450 kPa).

Although FIG. 3 shows the lower boundary of the ADC at 0V, it will be appreciated that often a monitored pressure range will have a lower boundary of other than 0V. The lower boundary of 0V has been chosen simply for ease of illustration and is in no way limiting.

Figure 4:
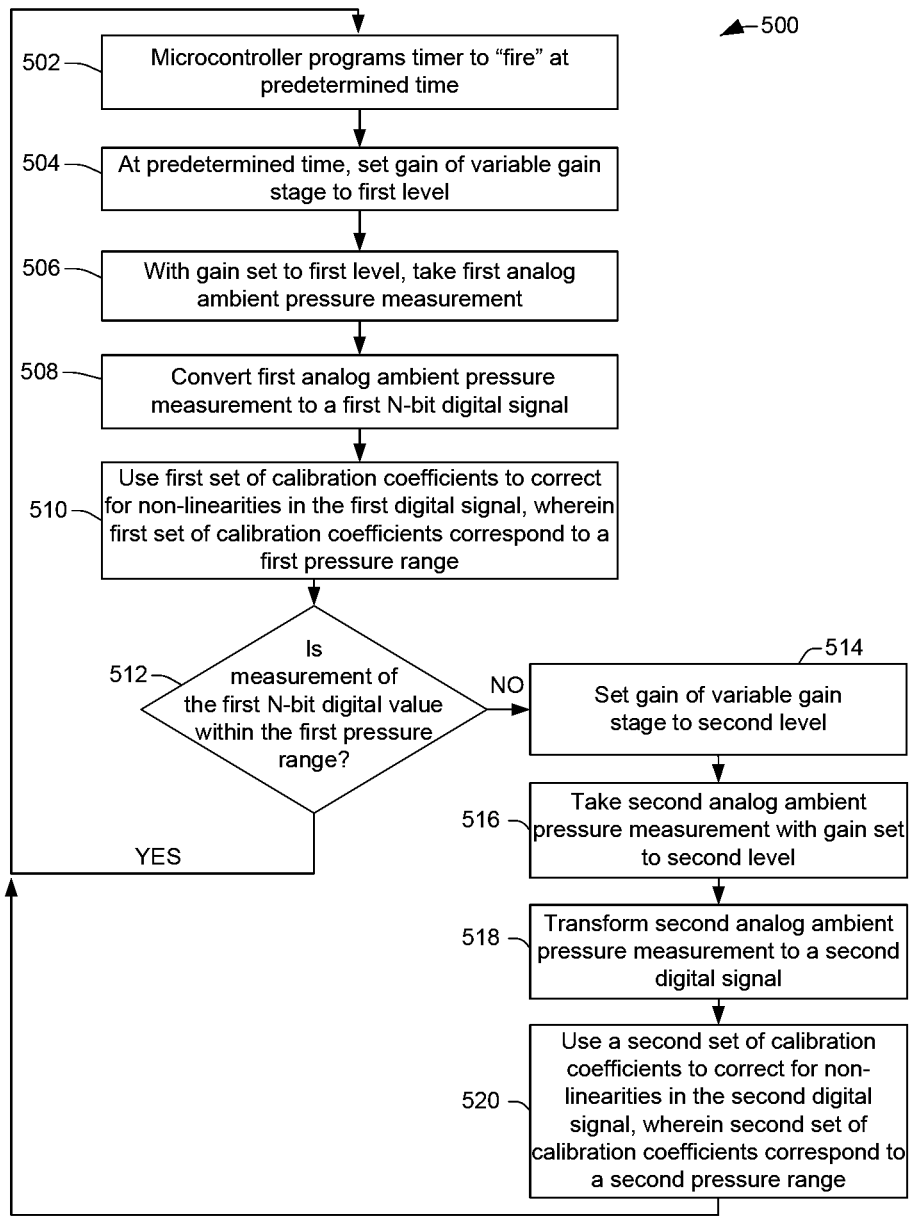
FIG. 4 is a flowchart illustrating a methodology consistent with one example of FIG. 2's block diagram.

FIG. 4 shows a method 500 consistent with one example carried out by the pressure monitoring system 300 of FIG. 2, although this methodology could also be carried out using other pressure monitoring systems.

At 502, a microcontroller (e.g., microcontroller 308 in FIG. 2) can program a timer (e.g., timer 314 in FIG. 2) to assert an interrupt or wakeup signal at a predetermined time. The predetermined time can follow a regularly spaced periodic pattern, or can occur at non-regularly spaced intervals.

At 504, the timer "fires" at the predetermined time and the gain of a variable gain stage (e.g., variable gain stage 304 in FIG. 2) is set to a first level. The first level often corresponds to a first pressure range.

At 506 while the gain is set to the first level, a pressure sensor (e.g., pressure sensor 302 in FIG. 2) takes a "raw" analog ambient pressure measurement.

At 508, the ADC transforms the analog signal to a first N-bit digital value while the gain is set to the first level.

At 510, when this first N-bit digital value is read, a first set of calibration coefficients is applied to the first N-bit digital value to account for non-linearities and offset errors in the pressure sensor and/or ADC over the first pressure range (e.g., 100 kPa-450 kPa). In this way, a first calibrated N-bit digital value is provided. Note that there's no requirement that the number of bits in the calibrated digital value area the same as the number of bits of ADC. For example, in one implementation, the ADC is 10 bits, yet the calibrated value is a 16-bit number.

At 512, the method 500 determines whether the first calibrated N-bit digital value is within the first pressure range. If so ('YES' at 512), then no further processing is performed, and the method returns to 502 or 504 to wait for the next predetermined time.

If the first calibrated measurement falls outside of the first pressure range ('NO' at 512), then a second pressure measurement is performed in blocks 514-520—this time with a different gain setting for the variable gain stage. Often, the gain setting used during block 514-520 is greater than the gain setting used during 504-510 (i.e. first pressure range is a subset of the second pressure range).

More particularly, at 514, the gain of the variable gain stage is set to a second level. At 516, a second "raw" analog ambient pressure measurement is taken with the gain set to the second level. At 518, the second "raw" analog ambient pressure measurement is transformed into a second N-bit digital value via the ADC. When this second N-bit digital value is read, a second set of calibration coefficients is applied to the second N-bit digital value to account for non-linearities and offset errors in the pressure sensor and/or ADC over a second pressure range (e.g., 100 kPa-850 kPa), as shown in 520.

After 520, the method analyzes the first and second N-bit digital values, and makes a determination which measured pressure is accurate. The microprocessor then determines whether the measured pressure falls outside of a specified pressure range. If the measured pressure is outside of this specified range, the microcontroller can notify the vehicle operator or take other suitable remedial action to help ensure that the unexpected pressure is suitably dealt with.

In some embodiments, rather than always performing two pressure measurements in a fixed sequence, the microcontroller can attempt to use the same pressure range as was determined for the previous ambient pressure measurement. For example, if the microcontroller determines the ambient pressure for one measurement falls within a 100 kPa-450 kPa pressure range, the microcontroller can then take the next ambient pressure measurement under conditions for the same pressure range. With the assumption that the pressure inside the tire is changing slowly over time, the previous range is more often than not the appropriate range for subsequent measurements, also. By taking only a single pressure measurement instead of two pressure measurements, such an implementation reduces power. A second measurement is taken only when the microcontroller determines that the single pressure measurement may be erroneous.

Although pressure measurements as described above with regards to FIG. 4 are taken only at predetermined times, in other embodiments the pressure sensor can monitor continuously without being triggered based on an interrupt or periodic wakeup. However, because pressure often changes relatively slowly and because such continuous monitoring tends to consume more power, an interrupt based or periodic wakeup approach is often more desirable.

Figure 5:
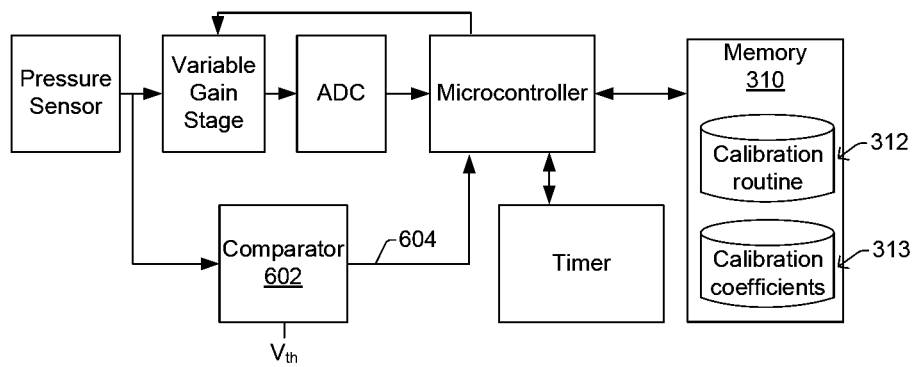
FIG. 5 is a block diagram illustrating a pressure sensor system in accordance with some embodiments of the present disclosure.
Figure 6:
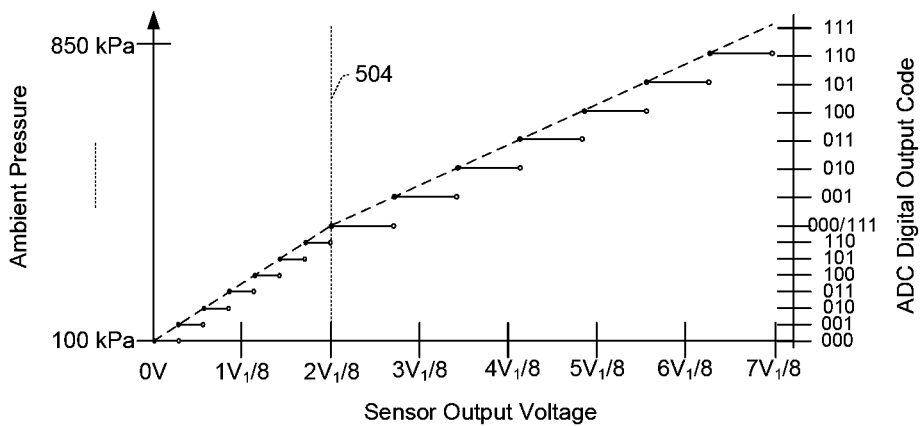
FIG. 6 is a plot illustrating functionality consistent with one example of FIG. 5's block diagram.

FIGS. 5-6 show another embodiment wherein a pressure monitoring system includes a comparator 602 in addition to the previously discussed components. Rather than carrying out two separate ambient pressure measurements (e.g., one pressure measurement assuming a first pressure range and a second pressure measurement assuming a second pressure range as in FIG. 3's example), the comparator 602 acts as a control element to provide a control signal 604 that notifies the microcontroller whether the ambient pressure is in the first or second pressure range.

FIG. 6 shows an example of how a comparator could be used in the context of a 3-bit ADC. The comparator compares the level of the analog signal with a threshold signal. If the control signal is in a first state (e.g., indicating the comparator detected the pressure was less than the threshold), the microcontroller sets the variable gain stage to a first gain level, such that the ADC output codes are spread approximately equally over the first pressure range. If the control signal is in a second state (e.g., indicating the comparator detected the pressure was greater than the threshold), the microcontroller sets the variable gain stage to a second gain level, such that the ADC output codes are spread approximately equally over the second pressure range. Thus, in embodiments consistent with FIGS. 6-7, the control signal 604 acts as a flexible control bit.

FIG. 8 shows an embodiment of a dual sensor module 700 consistent with some embodiments. The dual sensor module includes a first sensor 702 (e.g., an accelerometer) and a second sensor 704 (e.g., a pressure sensor), although other embodiments can include more than two sensors. To take sensor measurements, the dual sensor module 700 also includes a multiplexer 706, a variable gain stage 708, an ADC 710, a microcontroller 712, a memory unit 714 and a decoder/state machine 716. Although the first and second sensors 702, 704 are described with respect to an accelerometer and a pressure sensor, respectively, it will be appreciated that any type of sensor can be utilized in accordance with this present disclosure.

During operation, the microcontroller 712 provides an N-bit sensor control word on control bus 718 to the decoder/state machine 716. For example, in one embodiment the N-bit sensor control word can include 5-bits and take the format shown in Table 1:

TABLE 1

Sample Sensor control word format

| | |
|---|---|
| Bit 5 (sensor type) | 0 = acceleration |
| | 1 = pressure |
| Bit 4 (pressure range) | 0 = low pressure |
| | 1 = high pressure |
| Bit 3 (automatic range selection) | 0 = manual range selection |
| | 1 = automatic range selection |
| Bits 2:1 (ADC gain) | 00 = gain 76 |
| | 01 = gain 60 |
| | 10 = gain 50 |
| | 11 = gain 38 |

Thus, upon the decoder/state machine receiving the control word from the microcontroller, the decoder/state machine can enable the proper blocks to carry out the functionality indicated by the control word.

Figure 7:
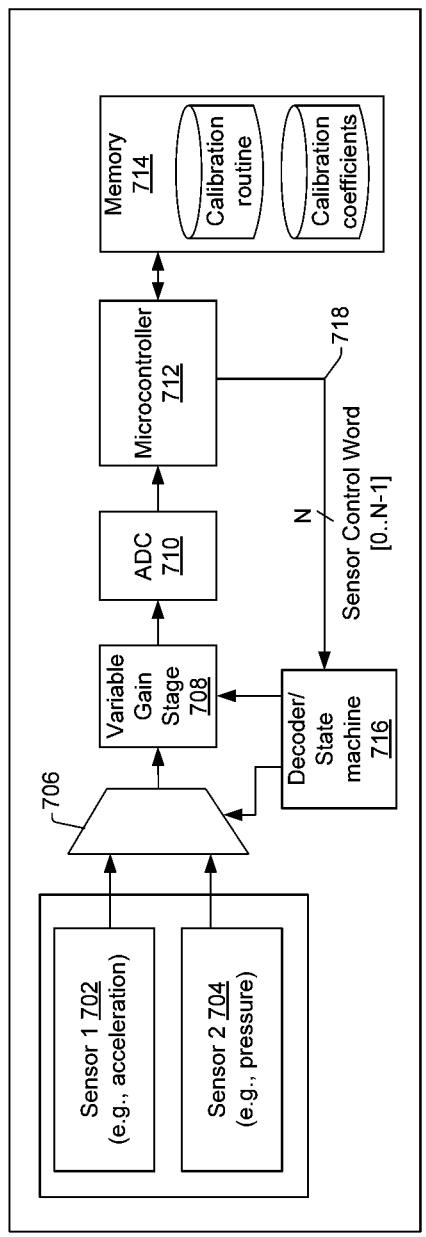
FIG. 7 is a block diagram of a dual-sensor module consistent with one embodiment.

FIG. 8 shows a method illustrating one example of how an N-bit control word can induce functionality in the dual-sensor module consistent with FIG. 7.

At 802, the method analyzes the control word to determine the type of sensor to be read. If the method determines an acceleration measurement is to be taken ('YES' at 802), then the method proceeds to 804 where it sets the gain of the ADC to a first level. Subsequently at 806, an acceleration measurement is taken by converting the analog voltage from the accelerometer to a digital value while the first gain level is used for the ADC.

In contrast if a pressure measurement is to be taken ('NO' at 802), the method continues to 808 wherein it determines if manual or automatic pressure sensing is to be performed. If manual pressure sensing is selected ('YES' at 808), the method continues to 810 where the method evaluates whether a low pressure range or a high pressure range is to be read. If the low pressure range is to be read ('YES' at 810), the ADC gain is set to a second level in 812 after which an analog voltage from the pressure sensor is converted to a digital value using the second ADC gain level at 814. If the high pressure range is to be read ('NO' at 810), the ADC gain is set to a third level in 816 after which an analog voltage from the pressure sensor is converted to a digital value using the third ADC gain level at 814.

If automatic pressure sensing is selected ('NO' at 808), the method progresses to 818 to determine whether a high pressure range or low pressure range is to be read first. If the low range is to be read first ('YES') at 818, the gain level of the ADC is set to a second level at 820, where the second ADC gain level can be different from the first ADC gain level (at 804). In 822, an analog voltage of the pressure sensor is converted to a digital value. At 824, the method determines whether the ambient pressure is greater than a high pressure threshold (PTh_High). If not ('NO' at 824), then the digital value from 822 is believed to be correct and no further measurements are taken, thereby tending to limit power. If so, however ('YES' at 824), then the method sets the ADC gain to a third level to carry out a high pressure measurement in 826. In 828, an analog value is then read and converted into a digital value using the third ADC gain level.

If the high pressure range is to be read first ('NO' at 818), then blocks 830-838 are followed. Notably, blocks 838 can utilize a different pressure threshold PTh_Low (wherein PTh_Low is not necessarily the same as PTh_High) to determine whether the high pressure measurement is reliable.

Although the disclosure has been shown and described with respect to one or more implementations, equivalent alterations and modifications will occur to others skilled in the art based upon a reading and understanding of this specification and the annexed drawings. For example, although examples illustrated herein show only two pressure ranges, in other embodiments more than two pressure ranges can be included. Whatever the precise number of pressure ranges included, the pressure ranges can be entirely non-overlapping, partially overlapping, and/or may be spaced apart from one another. The pressure ranges be the same size (e.g., have respective endpoints that share a common difference therebetween) or can be different sizes (e.g., have respectively endpoints that have different differences therebetween). In addition, the range of the ADC range can not only changed by a gain stage, it could also be changed by changing the number of bits N is the digital output value.

The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more".

Furthermore, to the extent that the terms "includes", "having", "has", "with", or variants thereof are used in either the detailed description or the claims, such terms are intended to be inclusive in a manner similar to the term "comprising."

What is claimed is:

1. A pressure monitoring device comprising:
    an analog-to-digital converter (ADC) to receive an analog signal and to convert the analog signal to a digital signal;
    wherein the device is configured to apply in a first state a first set of calibration coefficients to the digital signal, the first set of calibration coefficients associated with a first pressure range and to apply in a second state a second set of calibration coefficients to the digital signal, the second set of calibration coefficients associated with a second pressure range different than the first pressure range, and wherein endpoints bounding the first pressure range are separated by a first difference that is greater than a second difference separating endpoints bounding the second pressure range.

2. The device of claim 1, further comprising:
a pressure sensor
a variable gain stage between the pressure sensor and the ADC, wherein a control signal causes the variable gain stage to change from a first gain to a second gain, thereby causing the change from the first state to the second state, respectively.

3. The device of claim 2, further comprising a control element, wherein the control element comprises a microcontroller to provide the control signal.

4. The device of claim 3, wherein the control element comprises a comparator to compare the analog signal with a pressure threshold, and wherein the change from the first state to the second state is based on the comparison.

5. The device of claim 1, wherein the first and second sets of calibration coefficients account for non-linearities and/or other error contributors in the ADC and pressure sensor over the first and second pressure ranges, respectively.

6. The device of claim 1, wherein the first pressure range falls entirely within the second pressure range.

7. The device of claim 1, wherein the first pressure range only partially overlaps the second pressure range without falling entirely within the second pressure range.

8. The device of claim 1, wherein the first pressure range and second pressure range are non-overlapping.

9. The device of claim 1, wherein neighboring unique output codes in the first pressure range are spaced apart by a first distance, and wherein neighboring unique output codes in the second pressure range are spaced apart by a second distance.

10. A method of pressure monitoring, comprising:
receiving an analog pressure signal from a pressure sensor;
converting the analog pressure signal to a digital signal by an analog-to-digital converter,
applying, by a controller, in a first state corresponding to a first pressure range measurement a first set of calibration coefficients to the digital signal, and
applying, by the controller, in a second state corresponding to a second pressure range measurement a second set of calibration coefficients to the digital signal, wherein endpoints bounding the first pressure range are separated by a first difference that is greater than a second difference separating endpoints bounding the second pressure range.

11. The method of claim 10, further comprising:
upon receiving a request to monitor pressure, setting a control signal to indicate the first state and storing a first digital pressure measurement and subsequently setting the control signal to indicate the second state and storing a second digital pressure measurement.

12. The method of claim 11, further comprising:
selecting one of the first and second digital pressure measurements and providing the selected digital pressure measurement in response to the request to measure the pressure.

13. The method of claim 10, wherein in the first state the analog pressure signal is based on an output signal of the pressure sensor amplified by a first gain and wherein in the second state the analog pressure signal is based on the output signal from the pressure sensor amplified by a second gain.

14. The method of claim 13, further comprising:
determining to apply the first set of calibration coefficients, when the output signal from the pressure sensor is lower than a threshold, and
determining to apply the second set of calibration coefficients, when the output signal from the pressure sensor is greater than the threshold.

* * * * *